(12) United States Patent
Chen et al.

(10) Patent No.: US 6,799,281 B1
(45) Date of Patent: Sep. 28, 2004

(54) DSP SYSTEM FOR CAPTURING DATA AT A FIXED RATE

(75) Inventors: Hsin-Mei Chen, Hsinchu Hsien (TW); Chung-Ping Hsu, Taipei (TW)

(73) Assignee: Winbond Electronics Corp., Hsinchu (TW)

( * ) Notice: Subject to any disclaimer, the term of this patent is extended or adjusted under 35 U.S.C. 154(b) by 618 days.

(21) Appl. No.: 09/812,005

(22) Filed: Mar. 19, 2001

(30) Foreign Application Priority Data

Jan. 19, 2001 (TW) .................................... 90201159 U

(51) Int. Cl.[7] .............................................. G06F 1/12
(52) U.S. Cl. ..................... 713/400; 713/400; 711/100
(58) Field of Search ........................ 713/400; 711/100

(56) References Cited

U.S. PATENT DOCUMENTS

| | | | | |
|---|---|---|---|---|
| 4,160,127 A | * | 7/1979 | Slana et al. .................. 370/217 |
| 5,546,547 A | * | 8/1996 | Bowes et al. ................ 710/114 |
| 5,761,200 A | * | 6/1998 | Hsieh .......................... 370/364 |
| 5,786,851 A | * | 7/1998 | Kondo et al. ............. 348/222.1 |
| 5,815,583 A | * | 9/1998 | Solomon et al. ............... 381/77 |
| 5,883,804 A | * | 3/1999 | Christensen ................. 700/94 |
| 6,047,339 A | * | 4/2000 | Su et al. ........................ 710/56 |
| 6,088,746 A | * | 7/2000 | Koppa ........................ 710/63 |
| 6,412,024 B1 | * | 6/2002 | Hsu et al. ....................... 710/5 |
| 6,504,854 B1 | * | 1/2003 | Hofmann et al. ............ 370/518 |
| 6,593,967 B1 | * | 7/2003 | McGarvey et al. .......... 348/312 |
| 6,629,001 B1 | * | 9/2003 | Vadivelu ...................... 700/94 |

* cited by examiner

*Primary Examiner*—Lynne H. Browne
*Assistant Examiner*—Nitin Patel
(74) *Attorney, Agent, or Firm*—Ladas & Parry LLP

(57) ABSTRACT

A DSP system, capturing the data from a main bus via a bus operating at the clock speed of a first frequency, and sending the data to a DSP unit reading the data at the clock speed of a second frequency, the DSP system comprising: a bus control unit, which is adapted to transfer data from the main bus to the bus; a pulse wave generator, producing a pulse wave that synchronous to the bus, the pulse wave is comprised of sequential time slots, wherein a part of the time slots are DRQ slots that respectively comprises a data requesting signal, and the other times slots are normal slots; and an interface unit, capturing the data from the bus control unit via the bus according to the data requesting signal, and transmitting the data to the DSP unit. According to the DSP system of the present invention, the FIFO register that used in the prior art could be abandoned, whereby saving the occupied space of the whole system.

14 Claims, 4 Drawing Sheets

DSP SYSTEM FOR CAPTURING DATA AT A FIXED RATE

BACKGROUND OF THE INVENTION

1. Field of the Invention

The present invention relates to a digital signal processing system (hereinafter referred to as 'DSP system'), and particularly relates to an apparatus, which captures data from an expansion bus at a fixed rate and subsequently inputs the data to a DSP device. Wherein, the DSP device receives information at another rate asynchronous to the fixed rate of the expansion bus.

2. Description of the Related Art

Many computer peripherals, for example, video cards, audio cards or specific PCMCIA cards, are comprised of DSP devices. Generally, A DSP device is comprised of a central processing unit (CPU), and is programmable so that it may be used to control the readings and writings of data, which is transferred via a plurality of signal lines coupled to the DSP device. However, instead of managing data at an optional schedule, some kinds of DSP devices, such as the DSP of an audio card, are designed to capture (or send out) data at fixed rates. FIG. 1 shows the prior art about a traditional PC audio system. The system comprises a DSP unit 1, a three-step first-in-first-out register (hereinafter referred to as 'FIFO') 5, an expansion bus 2, a south bridge unit 3, and an interface unit 4. Wherein, the south bridge unit 3 (for example, the Intel AC-97 Controller) communicates with the main bus (not shown) of the PC through a north bridge unit (not shown), and the interface control unit 4 is provided as a communicating interface between the DSP unit 1 and the expansion bus 2 (for example, a bus of AC-Link standard). The DSP unit 1 transmits a DRQ (data requisition) signal to the interface control unit 4, whereby the data, which is transferred through the interface unit 4 according to the protocol between the above-mentioned south and north bridge units, is available to the DSP unit 1. However, the DSP unit 1 is asynchronous to the data flow transferred in the expansion bus 2. To solve the problem, the data is pre-stored into the FIFO register 5. Accordingly, the DSP unit 1 captures the data from the expansion bus 2 indirectly by reading the data stored in the FIFO register 5.

However, the prior art has the disadvantage that the FIFO register 5 occupies a lot of area. It is disadvantageous for the size reduction of the DSP system.

The data flow in the bus is transferred in packets. In fact, to realize a system that captures data at a fixed rate, the point is a proper arrangement for the data-acquisition interval of the DSP device. Wherein, the data-acquisition interval is a period of time, which is required for the DSP to completely receive a packet of the data. The data-acquisition interval of the DSP should be contained in a data valid interval of the packet of data. Therefore, a buffer, such as the FIFO register mentioned above, is not necessary.

SUMMARY OF THE INVENTION

Accordingly, the present invention provides a DSP system, capturing the data from a main bus via a bus operating at the clock speed of a first frequency, and sending the data to a DSP unit reading the data at the clock speed of a second frequency, the DSP system comprising: a bus control unit, which is adapted to transfer data from the main bus to the bus; a pulse wave generator, producing a pulse wave that is synchronous to the bus. The pulse wave is comprised of sequential time slots, wherein a part of the time slots are DRQ slots that respectively comprise a data requesting signal, and the other times slots are normal slots; and an interface unit, capturing the data from the bus control unit via the bus according to the data requesting signal, and transmitting the data to the DSP unit.

Wherein, the interface unit transmits the data to the DSP unit in data valid intervals, and the DSP unit receives the data in data reading intervals, wherein each of the data reading intervals is covered by one of the data valid intervals.

Wherein one of the data requesting signals starts substantially at a first instance; another one of the data requesting signals and one of the data valid intervals start substantially at a same second instance; and the second instance is delayed from the first instance with one period corresponding to the first frequency.

Wherein, one of the DRQ slots, which comprises a data requesting signal starting at the first instance, is set as a first slot. For the first frequency is a, and the second frequency is b, and a>b, for natural numbers x and n, as the condition $a(n-1)/b < x \leq an/b - 1$ is satisfied, the xth time slot behind the first slot is a normal slot. Furthermore, as the condition $an/b - 1 < x \leq an/b$ is satisfied, the xth time slot behind the first slot is a DRQ slot.

Wherein, the data requesting signal is a data requesting pulse. The bus is in the AC-link standard, and the first frequency is substantially 48 KHZ. Wherein, the bus control unit is an AC-97 Controller, which is a south bridge controller.

Furthermore, the second frequency is substantially 44.1 KHZ. Additionally, the second frequency may be substantially 22.05 KHZ, 11.025 KHZ, 32 KHZ, 16 KHZ, or 8 KHZ.

BRIEF DESCRIPTION OF THE DRAWINGS

The present invention can be fully understood from the following detailed description and preferred embodiment with reference to the accompanying drawings in which.

DETAILED DESCRIPTION OF THE EMBODIMENT

Figure 1:
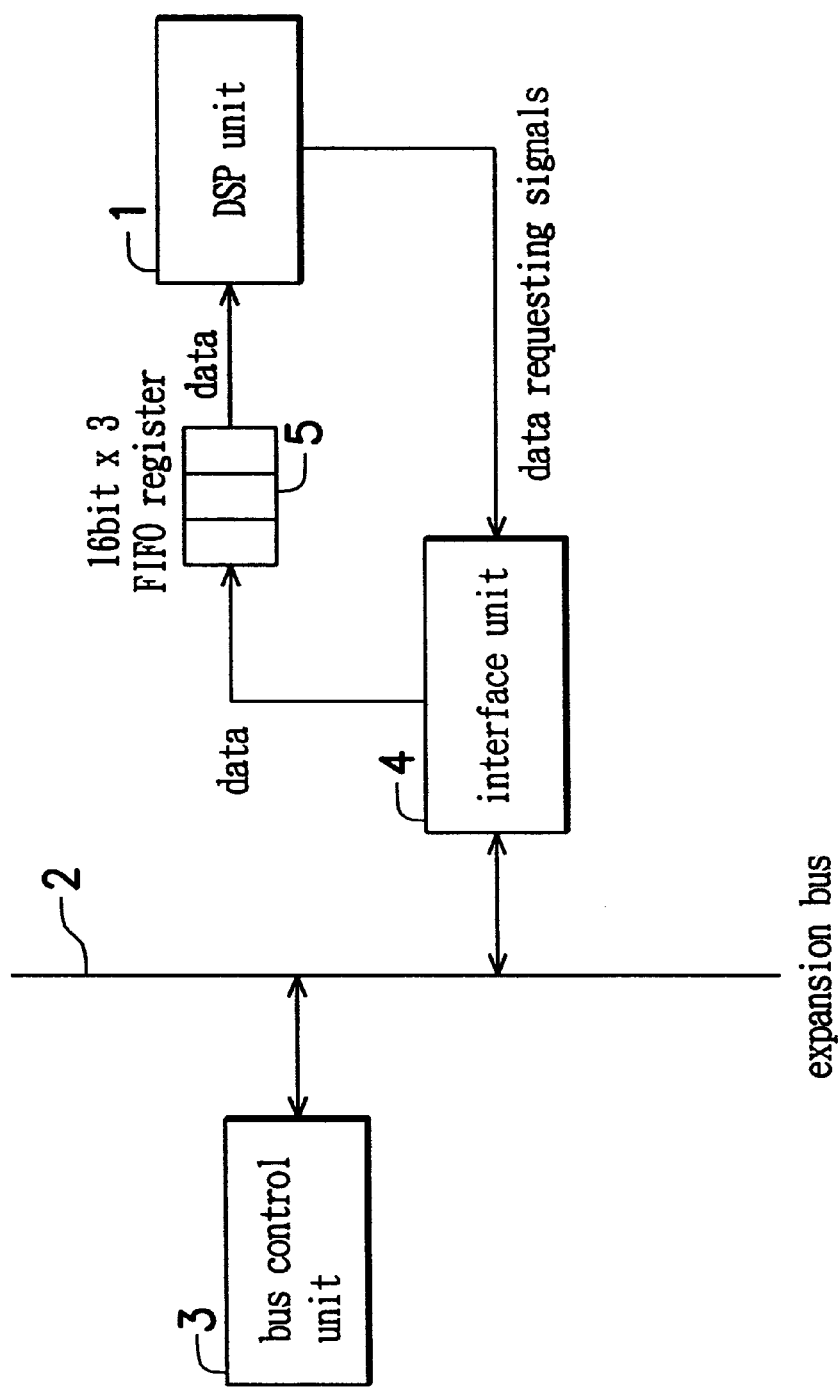
FIG. 1 is a circuit chart, showing a conventional audio system of PC.
Figure 2:
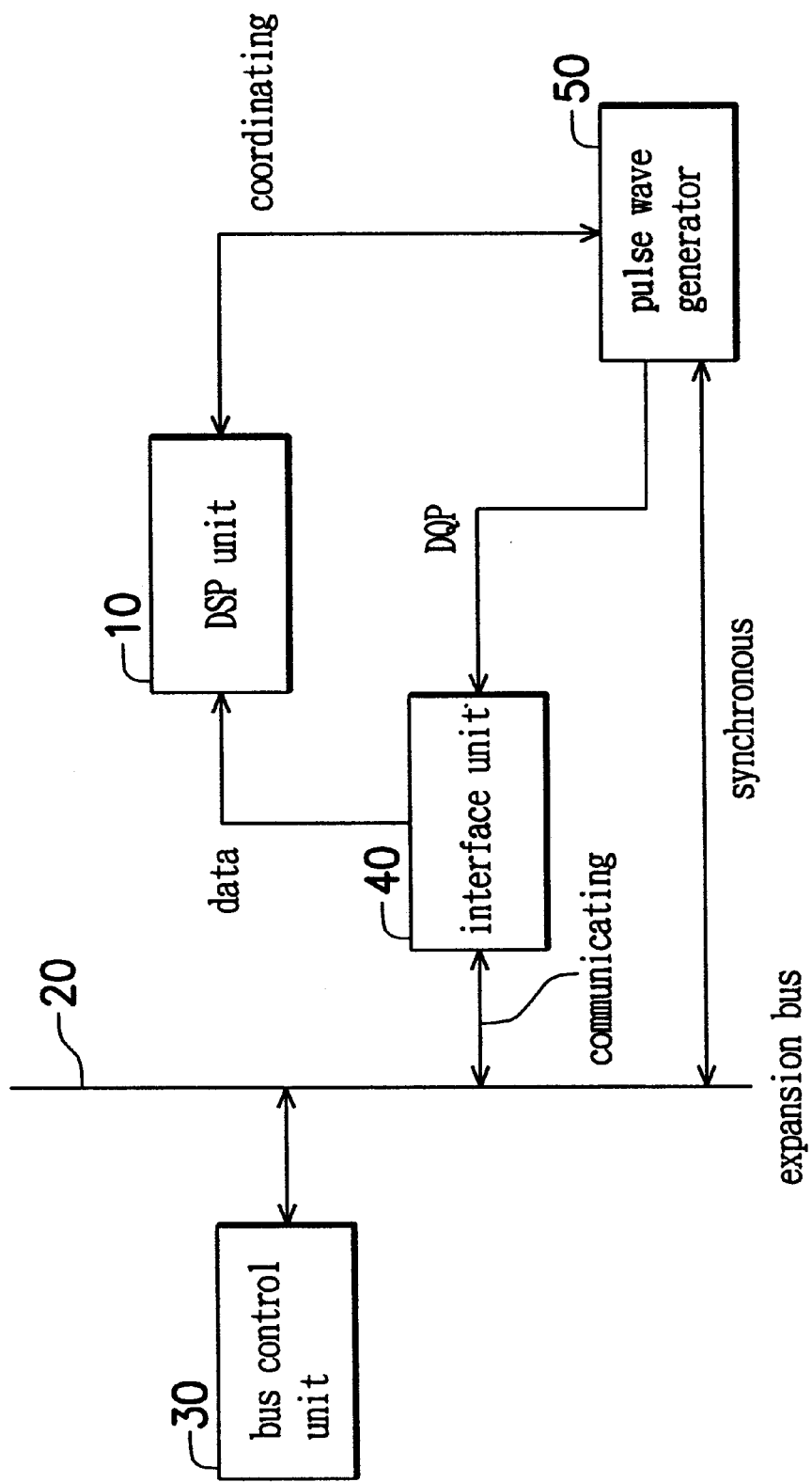
FIG. 2 is a circuit chart, showing the circuit of an embodiment according to the present invention.

FIG. 2 shows a DSP system, which is an embodiment according to the present invention. The system comprises a DSP unit 10, a bus 20, a bus control unit 30, an interface unit 40, and a pulse wave generator 50 that coordinated with the DSP unit 10. Wherein, the bus control unit 30 (which is preferably an AC-97 Controller of Intel in this case) communicates with the CPU of the PC via a north bridge control unit (not shown), whereby data could be transferred from the main bus (not shown) of the PC to the bus 20, which is also an expansion bus in this case. The interface unit 40 is a communicating interface between the DSP unit 10 and the bus 20 (which is preferably an AC-Link standard bus in this case), which is subject to different timing. Wherein, the bus 20 operating at the clock speed of a first frequency F1, and the DSP unit 10 operating at the clock speed of a second frequency F2.

Figure 3:
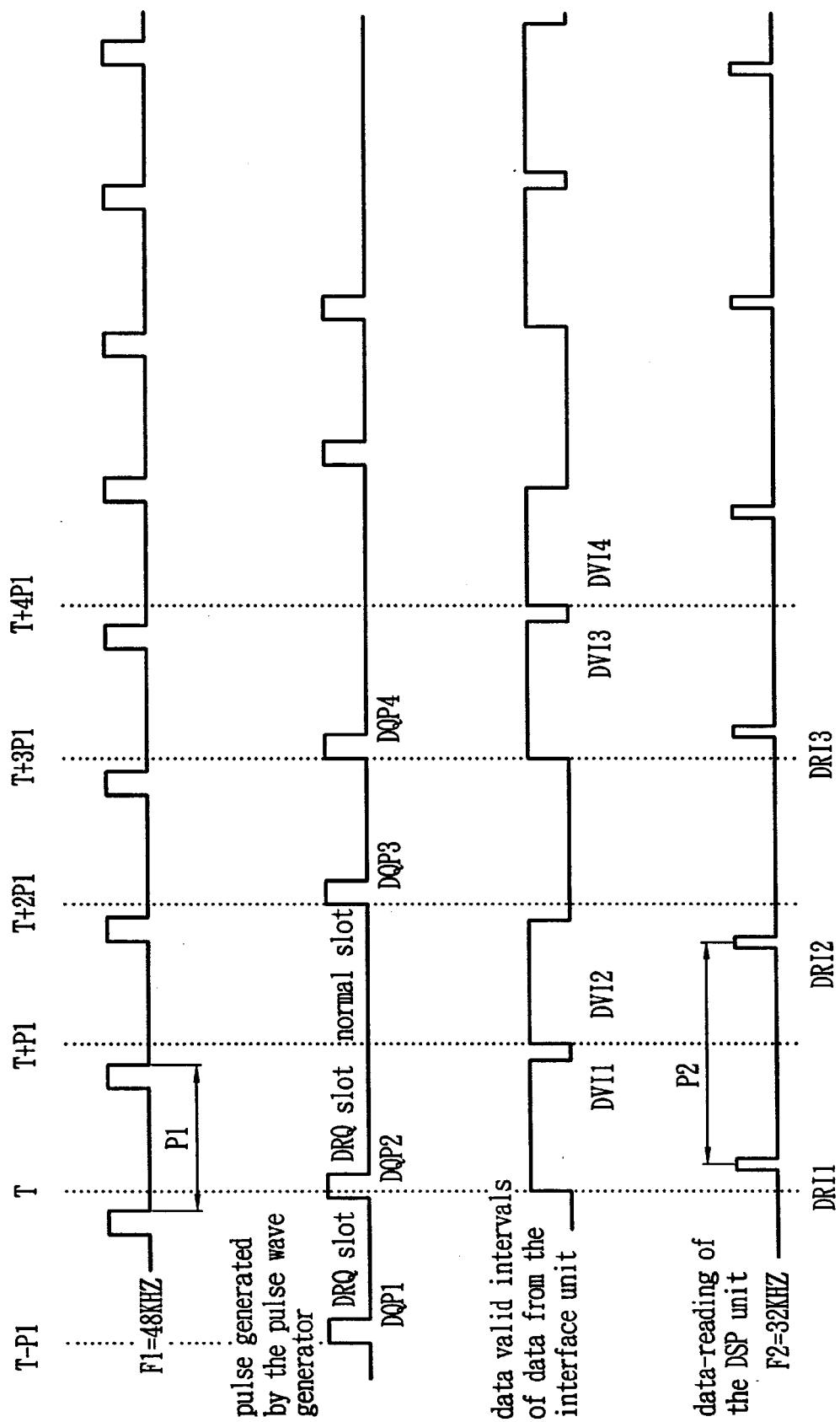
FIG. 3 shows the timing chart of an embodiment according to the present invention.

Refer to FIG. 3. At a fixed rate, the pulse wave generator 50 generates a pulse wave synchronous to the bus 20, wherein the pulse wave comprises sequential time slots to the interface unit 40. Parts of the time slots are DRQ (data requesting) slots, which comprise respectively a data-requesting signal. Preferably, the data requesting signals are in the form of pulses, which are indicated as DQP (data requesting pulse). On the other hand, time slots that include no DQP are named as normal slots, as shown in FIG. 3.

As shown in FIG. 3, the fixed rate mentioned above is synchronous to the clock speed of the bus 20. Accordingly, the time slots are separated with a period P1, which is corresponding to the first frequency F1.

In FIG. 3, at an instance time T−P1, the interface unit 40 receives a DQP (DQP1) from the pulse wave generator 50. Then at an instance time T, which is one period P1 delayed from the time T−P1, the interface unit 40 starts transmitting the data captured from the bus 20 to the DSP unit 10.

Similar in case to most electric devices, the data outputted from the interface unit 40 is only readable within one data valid interval, which is indicated by DVI.

Correspondingly, the DSP unit 10 reads every packet of data in one data-reading interval, which is indicated by DRI, as shown in FIG. 3. The DRI intervals are separated with a fixed period P2, which is corresponding to the second frequency F2. For the DSP unit, the DRI is a minimum time required to completely capture the data. Therefore, for the transmission of the same packet of data, the corresponding DRI interval of the DSP unit 10 should be completely covered by the corresponding DVI interval of the interface unit 40.

The wave generator 50 is the key point. In an arrangement of the pulse wave thereof, the ratio, or difference between the first and second frequency must be taken into consideration, whereby the every DRI interval of the DSP unit 10 could be completely covered in one corresponding DVI interval of the interface unit 40, as shown in FIG. 3.

To achieve the purpose mentioned above, the present invention provided two feasible embodiments.

The First Embodiment

Refer to FIG. 3, wherein the first frequency F1 is 48 KHZ, and the second frequency F2 is 32 KHZ. (wherein the frequency ratio is 3:2), For facilitating the pulse wave design of the pulse wave generator 50, a time instance T is set, whereby the DSP unit 10 starts it's first data-reading interval DRI1 immediately after the time T. Correspondingly, the pulse wave generator 50 pre-generates a first DQP signal DQP1 to the interface unit 40 at the time T−P1, whereby the interface unit 40, which is preferably synchronous to the pulse wave generator 50, would finish capturing data from the bus 20 in one operating period (equals to P1), and then the interface unit 40 starts providing the first packet of data from the bus 20 substantially at the time instance T. As mentioned above, the data is available to the DSP unit 10 in a data-valid interval DVI1 from the instance T, and the DSP unit 10 captures the data in the interval DRI1.

Afterward, pulse wave generator 50 generates a DQP2 substantially at the instance T, and correspondingly the interface unit 40 stars providing a second packet of data at time T+P1. The data is valid in the interval DVI2. Substantially at the instance T+1.5P1, the DSP unit 10 starts it's second data reading interval DRI2, which is cover by the interval DVI2, and then captures the data.

Within an time interval T+P1 to T+2P1, pulse wave generator 50 generates no data-requesting pulse. Consequently, in another time interval T+2P1 to T+3P1, there is no data transfer between the interface unit 40 and the DSP unit 10. From another point of view, the DSP 10 operates no data reading process from time T+2P1 to T+3P1, either.

Next, substantially at the instance T+2P1, the pulse wave generator 50 sends out another data-requesting pulse DQP3, and the interface unit 40 provides a packet of data that valid substantially within the interval T+3P1 to T+4P1 (DVI3). And then the DSP 10 captures the data substantially at the instance T+3P1.

The following procedures of the data transferring process in this embodiment are repetitions of the above-mentioned operations.

The Second Embodiment

Figure 4:
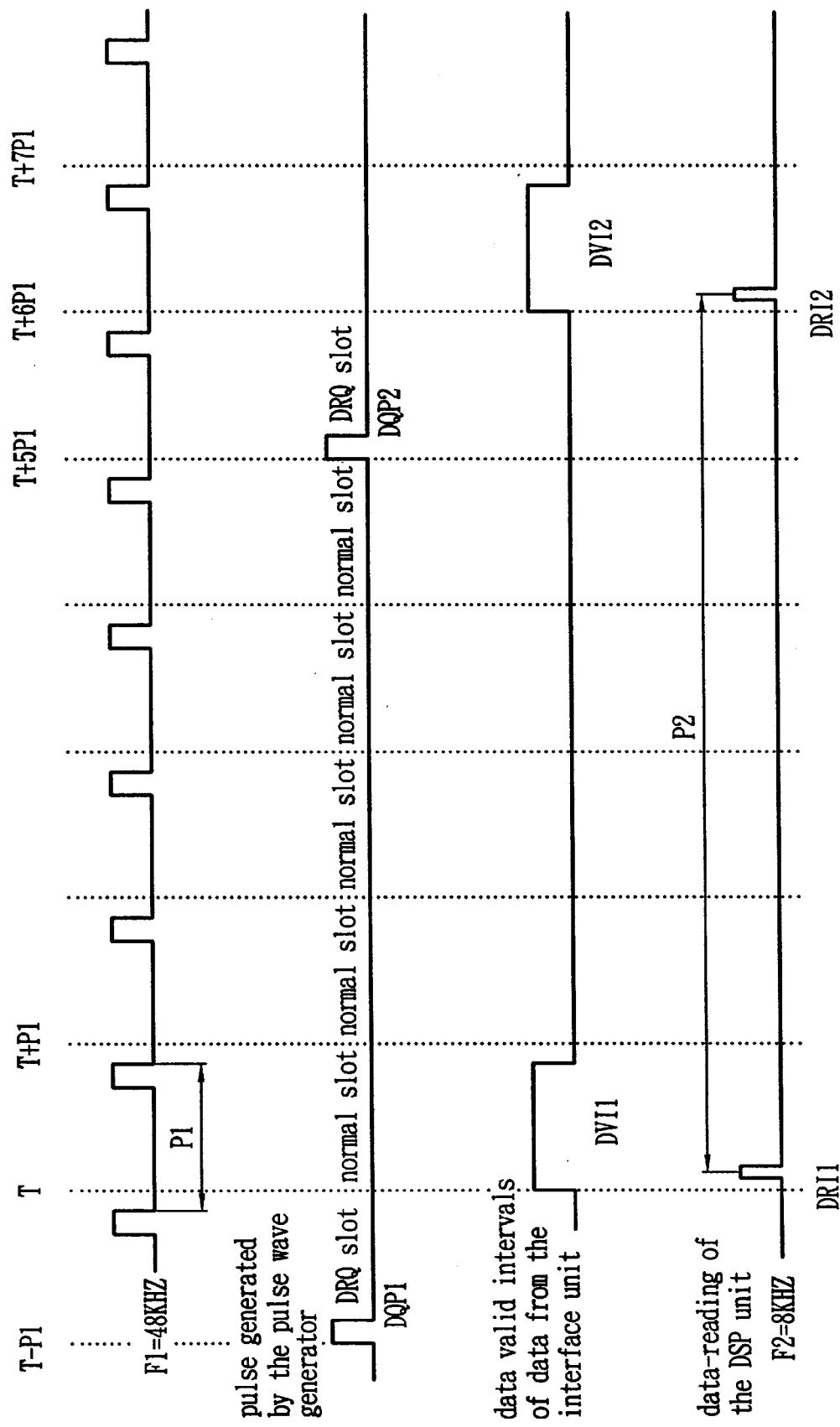
FIG. 4 shows the timing chart of another embodiment according to the present invention.

Refer to FIG. 4, wherein the first frequency F1 is 48 KHZ, and the second frequency F2 is 8 KHZ. (wherein the frequency ratio is 6:1), For facilitating the pulse wave design of the pulse wave generator 50, a time instance T is set, whereby the DSP unit 10 starts it's first data-reading interval DRI1 immediately after the instance T. Correspondingly, the pulse wave generator 50 pre-generates a first DQP signal DQP1 to the interface unit 40 at the time T−P1, whereby the interface unit 40, which is preferably synchronous to the pulse wave generator 50, would finish capturing data from the bus 20 in one operating period (equals to P1), and then the interface unit 40 starts providing the first packet of data from the bus 20 substantially at the time instance T. As mentioned above, the data is available to the DSP unit 10 in a data-valid interval DVI1 from the instance T, and the DSP unit 10 captures the data in the interval DRI1.

Within an time interval T to T+5P1, pulse wave generator 50 generates no data-requesting pulse. Consequently, in another time interval T+P1 to T+6P1, there is no data transfer between the interface unit 40 and the DSP unit 10. From another point of view, the DSP 10 operates no data reading process from time T+P1 to T+6P1, either.

Next, substantially at the instance T+5P1, the pulse wave generator 50 sends out another data-requesting pulse DQP2, and the interface unit 40 provides a packet of data that valid substantially within the interval T+6P1 to T+7P1 (DVI2). And then the DSP 10 captures the data substantially at the instance T+6P1.

The following procedures of the data transferring process in this embodiment are repetitions of the above-mentioned operations. Furthermore, in corresponding to various ratio of the first and second frequency F1,F2, the present invention provides a reference formula, whereby obtaining a arrangement rule for the DRQ slot generated by the pulse wave generator 50. The formula is shown below (the symbols T, P1, P2, etc., refer to the timing chart in FIG. 3 and FIG. 4):

Assuming that:

F1 is a MHZ, F2 is b MHZ, and a>b;

Then:

For natural numbers x and n, as the condition $a(n-1)/b < x \leq an/b - 1$ is satisfied, the xth time slot behind the first slot is a normal slot; and as the condition $an/b - 1 < x \leq an/b$ is satisfied, the xth time slot behind the first slot is a DRQ slot.

Wherein, the timing chart in FIGS. 3 and 4 could be found by following the formula. Moreover, other frequency ratios, such as 48/44.1, 48/22.05, 48/11.025, 48/16, etc., could be derived, too. However, note that the formula is only for reference. A DSP system designed by following the formula may further require some adjustment for the pulse wave generated. Specifically, some adjustments may be needed for the starting instance of the data requesting pulses DQP. The reason is, the data valid intervals DVI may not be of the same range as that shown in the timing charts, wherein the data transmitted may be effected by noises, the transient of data, or the decay of data as time approaching to the end of a DVI interval.

According to the DSP system of the present invention, the FIFO register that used in the prior art could be abandoned, whereby saving the occupied space of the whole system.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A DSP system, capturing the data from a main bus via a bus operating at a first frequency, and sending the data to a DSP unit reading the data at a second frequency, the DSP system comprising:

a bus control unit, which is adapted to transfer data from the main bus to the bus;

a pulse wave generator, producing a pulse wave that is synchronous to the bus, the pulse wave is comprised of sequential time slots, wherein a part of the time slots are DRQ slots that respectively comprises a data requesting signal, and the other times slots are normal slots; and an interface unit, capturing the data from the bus control unit via the bus according to the data requesting signal, and transmitting the data to the DSP unit.

2. The DSP system of claim 1, wherein the interface unit transmits the data to the DSP unit in data valid intervals, and the DSP unit receives the data in data reading intervals, wherein each of the data reading intervals is covered by one of the data valid intervals.

3. The DSP system of claim 2, wherein:

one of the data requesting signals starts substantially at a first instance;

another one of the data requesting signals and one of the data valid intervals start substantially at a same second instance; and the second instance is delayed from the first instance with one period corresponding to the first frequency.

4. The DSP system of claim 3, wherein:

one of the DRQ slots, which comprises a data requesting signal starting at the first instance, is set as a first slot;

for the first frequency is a, and the second frequency is b, and a>b, for natural numbers x and n, as the condition a(n−1)/b<x_an/b−1 is satisfied, the xth time slot behind the first slot is a normal slot; and as the condition an/b−1<x_an/b is satisfied, the xth time slot behind the first slot is a DRQ slot.

5. The DSP system of claim 3, wherein the data requesting signal is a data requesting pulse.

6. The DSP system of claim 3, wherein the bus is in the AC-link standard, and the first frequency is substantially 48 KHZ.

7. The DSP system of claim 3, wherein the bus control unit is an AC-97 Controller, which is a south bridge controller.

8. The DSP system of claim 3, wherein the second frequency is substantially 44.1 KHZ.

9. The DSP system of claim 3, wherein the second frequency is substantially 22.05 KHZ.

10. The DSP system of claim 3, wherein the second frequency is substantially 11.025 KHZ.

11. The DSP system of claim 3, wherein the second frequency is substantially 32 KHZ.

12. The DSP system of claim 3, wherein the second frequency is substantially 16 KHZ.

13. The DSP system of claim 3, wherein the second frequency is substantially 8 KHZ.

14. The DSP system of claim 1 wherein the pulse wave generator produces pulses at a fixed rate.

* * * * *